United States Patent
Ress, Jr.

(10) Patent No.: US 9,605,593 B2
(45) Date of Patent: Mar. 28, 2017

(54) GAS TURBINE ENGINE WITH SOFT MOUNTED PRE-SWIRL NOZZLE

(71) Applicant: Rolls-Royce North American Technologies, Inc., Indianapolis, IN (US)

(72) Inventor: Robert A. Ress, Jr., Carmel, IN (US)

(73) Assignee: Rolls-Royce North America Technologies, Inc., Indianapolis, IN (US)

( * ) Notice: Subject to any disclaimer, the term of this patent is extended or adjusted under 35 U.S.C. 154(b) by 403 days.

(21) Appl. No.: 14/197,894

(22) Filed: Mar. 5, 2014

(65) Prior Publication Data

US 2015/0121897 A1    May 7, 2015

Related U.S. Application Data

(60) Provisional application No. 61/773,639, filed on Mar. 6, 2013.

(51) Int. Cl.

| F23N 1/02 | (2006.01) |
|---|---|
| F23D 11/36 | (2006.01) |
| F23D 11/38 | (2006.01) |
| F02C 7/18 | (2006.01) |
| F01D 5/08 | (2006.01) |
| F01D 9/02 | (2006.01) |

(Continued)

(52) U.S. Cl.
CPC .............. *F02C 7/18* (2013.01); *F01D 5/081* (2013.01); *F01D 5/082* (2013.01); *F01D 9/023* (2013.01); *F01D 9/047* (2013.01); *F23R 3/60* (2013.01)

(58) Field of Classification Search
CPC .......... F01D 5/081; F01D 5/082; F01D 9/023; F23D 11/36; F23D 14/78; F23D 2206/10; F23D 2214/00; F02C 7/18; F02C 7/185; F23R 3/26; F23R 3/60; F02K 1/80
USPC ........................................ 431/12, 160, 253
See application file for complete search history.

(56) References Cited

U.S. PATENT DOCUMENTS

| 3,826,084 A | 7/1974 | Branstrom et al. |
|---|---|---|
| 4,674,955 A | 6/1987 | Howe et al. |
| 4,820,116 A | 4/1989 | Hovan et al. |

(Continued)

FOREIGN PATENT DOCUMENTS

| DE | 4223733 A1 | 1/1994 |
|---|---|---|
| EP | 2011968 A2 | 1/2009 |

(Continued)

OTHER PUBLICATIONS

International search report PCT/US2014/020432 mailed on Nov. 17, 2014.

*Primary Examiner* — Sarang Afzali
*Assistant Examiner* — Darrell C Ford
(74) *Attorney, Agent, or Firm* — Fishman Stewart PLLC

(57) ABSTRACT

An exemplary gas turbine engine may include a compressor, a turbine, and a combustor disposed between the compressor and the turbine. The combustor generally may have an inner casing. The exemplary gas turbine may further include a pre-swirl nozzle configured to receive a cooling stream. The cooling stream may be supplied from a cooled cooling air stream. The pre-swirl nozzle may further be configured to direct at least a portion of the cooling stream to the turbine. The pre-swirl nozzle may be flexibly mounted to the inner casing of the combustor.

18 Claims, 2 Drawing Sheets

(51) Int. Cl.
*F01D 9/04* (2006.01)
*F23R 3/60* (2006.01)

(56) References Cited

U.S. PATENT DOCUMENTS

| | | | |
|---|---|---|---|
| 5,252,026 | A | 10/1993 | Shepherd |
| 5,555,721 | A | 9/1996 | Bourneuf et al. |
| 6,183,193 | B1 | 2/2001 | Glasspoole et al. |
| 6,357,999 | B1 | 3/2002 | Pearce et al. |
| 6,422,812 | B1 | 7/2002 | Pepi et al. |
| 6,428,272 | B1 | 8/2002 | Pepi et al. |
| 6,595,741 | B2 | 7/2003 | Briesenick et al. |
| 7,121,791 | B2 | 10/2006 | Friedl et al. |
| 7,225,624 | B2 | 6/2007 | Ress, Jr. |
| 7,465,148 | B2 | 12/2008 | Klinger |
| 7,743,613 | B2 | 6/2010 | Lee et al. |
| 7,946,801 | B2 | 5/2011 | Shapiro et al. |
| 8,087,249 | B2 | 1/2012 | Ottaviano et al. |
| 2004/0025490 | A1* | 2/2004 | Paul .................. B64C 29/0075 60/39.43 |
| 2005/0223710 | A1* | 10/2005 | Creighton ................. F23R 3/28 60/740 |
| 2008/0256925 | A1* | 10/2008 | Pederson ................. F02K 9/48 60/258 |
| 2009/0241550 | A1* | 10/2009 | Petty ........................ F02K 1/10 60/771 |
| 2010/0102144 | A1* | 4/2010 | Conete ................. F01D 25/243 239/265.11 |
| 2010/0170265 | A1* | 7/2010 | Whaling ................. F01D 25/12 60/785 |
| 2010/0307166 | A1* | 12/2010 | Woodcock ............. F01D 9/023 60/796 |
| 2011/0020118 | A1* | 1/2011 | Smoke ..................... F01D 9/02 415/191 |
| 2012/0051923 | A1* | 3/2012 | McDonald ............. F01D 9/042 416/219 R |

FOREIGN PATENT DOCUMENTS

| | | |
|---|---|---|
| EP | 2051009 A2 | 4/2009 |
| FR | 2914707 A1 | 10/2008 |

* cited by examiner

GAS TURBINE ENGINE WITH SOFT MOUNTED PRE-SWIRL NOZZLE

CROSS-REFERENCE TO RELATED APPLICATIONS

This application claims priority to U.S. Provisional Patent Application No. 61/773,639, filed Mar. 6, 2013, the contents of which are hereby incorporated in their entirety.

FIELD OF TECHNOLOGY

The present disclosure generally relates to an improved gas turbine engine and more particularly, a turbine blade cooling circuit for any aerospace, industrial or marine gas turbine engine.

BACKGROUND

Gas turbine engines generally include a compressor, a combustor, and a turbine. Compressed air discharged from the compressor mixes with fuel in the combustor creating hot combustion gases, which are then directed to the turbine where they expand to provide rotation of a turbine rotor. Due to the high temperature of the hot combustion gases and high pressure ratios, both static and rotating components of the turbine, such as rotor blades, guide vanes, and disks, are subjected to high temperatures resulting from contact with the hot combustion gases. Cooling of these components is important to ensure that the engine operates properly and safely. To accomplish this, gas turbine engines often include an internal cooling system that incorporate cooling circuits through which a cooling fluid, such as air, is distributed to the various components.

The internal cooling systems may include a pre-swirl nozzle. The pre-swirl nozzle generally reduces losses in the cooling fluid flowing to the turbine rotor, effectively accelerating the cooling fluid, and thereby reducing the cooling fluid temperature. Most pre-swirl nozzles are either integral with or hard mounted to the aft inner casing of the combustor. Such hard-mounting offers little flexibility for tailoring material properties or geometry to match rotating seal fin growth to seal land growth throughout a flight cycle.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine generally may include a compressor, a turbine, and a combustor disposed between the compressor and the turbine. The combustor generally may have an inner casing. The exemplary gas turbine engine may also include a pre-swirl nozzle flexibly mounted to the inner casing of the combustor. The pre-swirl nozzle generally may be configured to receive a cooling stream, and direct at least a portion of it to the components of the turbine, such as the turbine rotor blades, for cooling. The flexible mounting of the pre-swirl nozzle may provide flexibility for tailoring material properties and/or geometry to match rotating seal fin growth to seal land growth throughout an operation cycle of the turbine.

An exemplary pre-swirl nozzle assembly may include a pre-swirl nozzle flexibly mountable to the combustor inner casing, as explained above. The exemplary pre-swirl nozzle assembly may also include a mounting component that enables the flexible mounting of the pre-swirl nozzle, effectively divorcing the pre-swirl nozzle from the inner casing. The flexible mounting of the pre-swirl nozzle further allows for tight seal clearances at the inboard and outboard seals, thereby minimizing leakage within different compartments in the engine.

Figure 1:
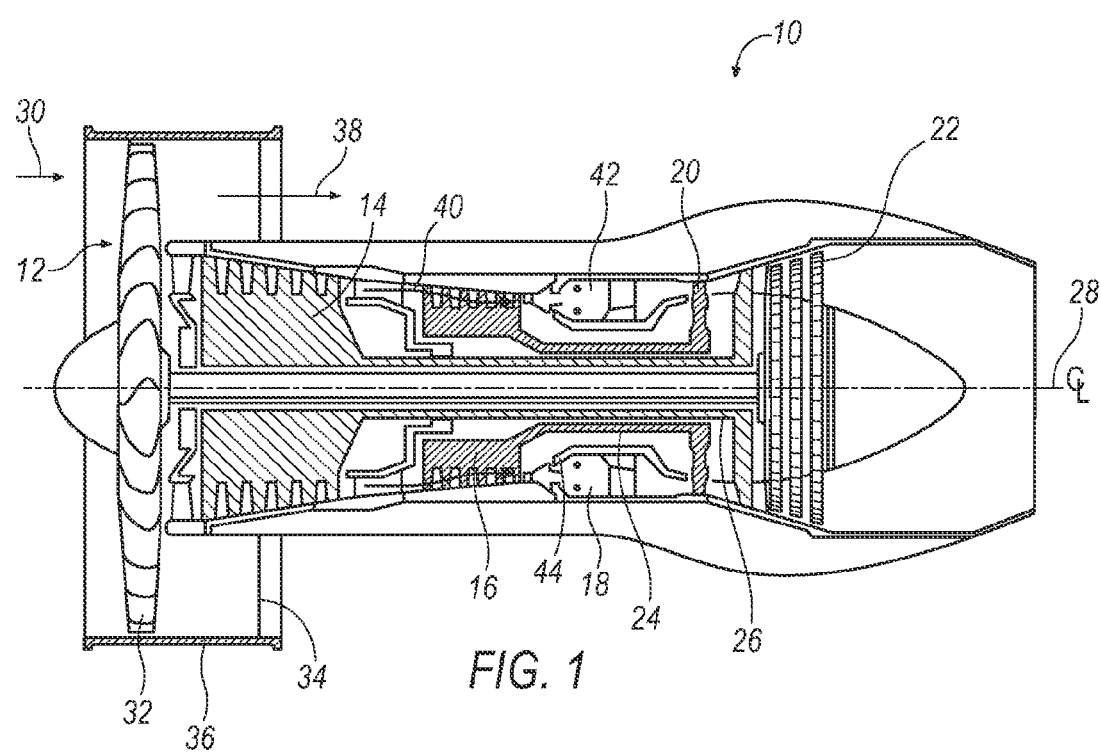
FIG. 1 is a schematic side view of an exemplary gas turbine engine.

Referring now to the figures, FIG. 1 illustrates an exemplary gas turbine engine 10. The gas turbine engine 10 may include a fan 12, a low pressure compressor 14, a high pressure compressor 16, a combustor 18, a high pressure turbine 20, and a low pressure turbine 22. The high pressure compressor 16 may be connected to a first rotor shaft 24, and the low pressure compressor 16 may be connected to a second rotor shaft 26. The shafts 24 and 26 may extend axially and may be parallel to a longitudinal center line axis 28.

Ambient air 30 may enter the fan 12 and may be directed across a fan rotor 32 in an annular duct 34, which may be circumscribed at least in part by a fan case 36. The ambient air 30 may be divided into bypass airflow 38 and a primary gas stream 40. The bypass airflow 38 may provide engine thrust, while the primary gas stream 40 may be directed to the combustor 18 and the high pressure turbine 20. The combustor 18 may have a bi-metal fastener assembly 42 for improved thermal growth compensation, and an inner casing 44.

Figure 2:
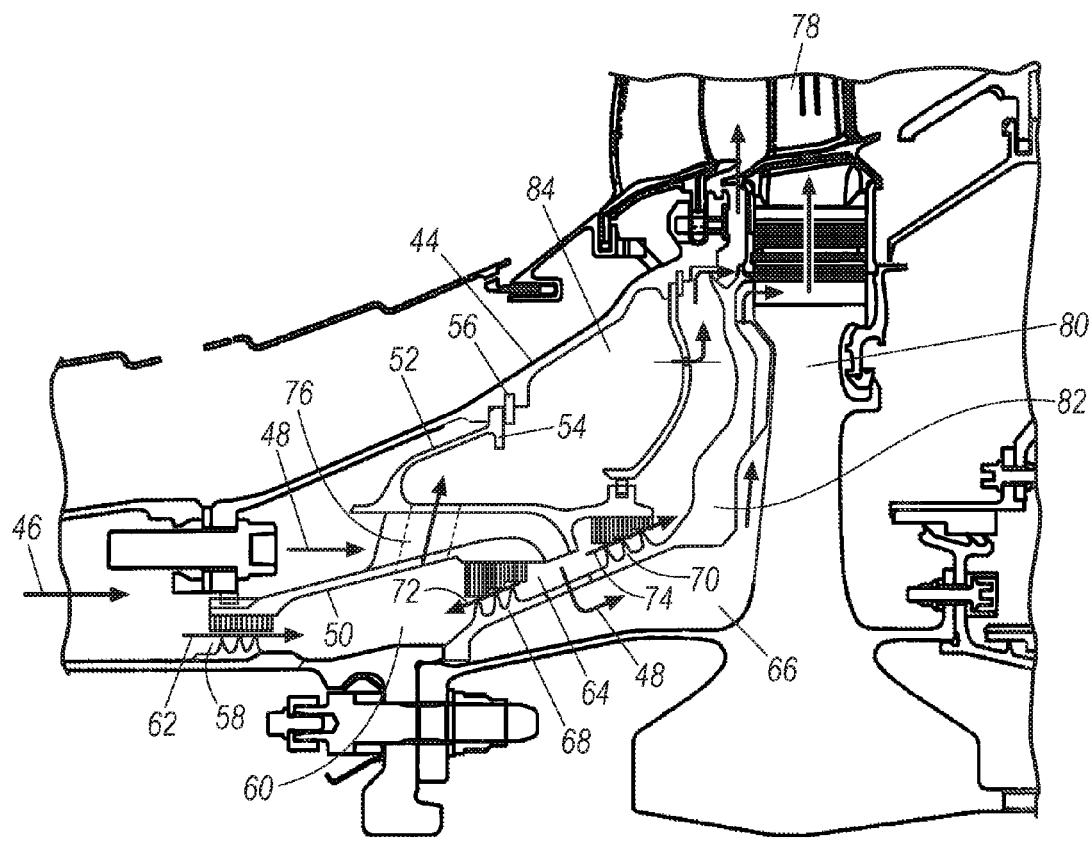
FIG. 2 is a schematic, partial side view of the exemplary gas turbine engine of FIG. 1 illustrating an exemplary pre-swirl nozzle assembly.

Referring now to FIG. 2, the gas turbine engine 10 may also include a pre-swirl nozzle 50. The pre-swirl nozzle 50 may be flexibly or soft mounted to the inner casing 44 of the combustor 18. The soft mounting of the pre-swirl nozzle 50 may allow for improved displacement matching with the turbine rotor during operation, thereby allowing for more flexibility with geometry and material options. For example, the material of the pre-swirl nozzle 50 may have a low coefficient of thermal expansion and/or a low density, such as with a titanium alloy. The material selection and the geometry thus can be tailored to achieve tight seal clearances, as described in more detail below. The wider range for material selection may also result in a reduction in weight, thereby improving performance of the gas turbine engine 10.

The soft mounting of the pre-swirl nozzle 50 may be accomplished by a mounting component 52. The mounting component 52 effectively divorces the pre-swirl nozzle 50 from the inner casing 44 such that they are not directly attached to each other. As seen in FIG. 2, the mounting component 52 may be substantially conical in shape, with an annular base portion 54 that may serve as the point of connection at which the mounting component 52 may be connected to the inner casing 44. This point of connection provides for the flexible mounting of the pre-swirl nozzle 50. The mounting component 52 may be attached to the inner casing 44 via a fastener (not shown), including, but not limited to, a bolt. Alternatively, as seen in FIG. 2, the mounting component 52 may be attached via an interference fit, for example, with a retaining ring 56. Attaching the mounting component 52 to the inner casing 44 by way of an interference fit as opposed to a fastener may improve the life of the mounting component 52 and/or the casing 44, and therefore the pre-swirl nozzle 50, by not impacting the integrity of the mounting component 52 and the inner casing 44.

The pre-swirl nozzle 50 generally may be configured to receive a cooling stream 48 and to direct the cooling stream 48 to at least one of the turbines 20 and 22 to cool components, including, but not limited to, rotor blades 78 and a turbine disc 80, and a full face cover plate (or mini disc) 82. As seen in FIG. 2, the cooling stream 48 may be supplied by a cooled cooling air (CCA) feed 46. The CCA feed 46 generally may be a portion of the primary gas stream 40 taken overboard and passed through a heat exchanger (not shown) where it may be cooled. In addition to or in lieu of the CCA feed 46, while not shown, the cooling stream 48 may be supplied directly from the primary gas stream 40 without having been cooled. However, the CCA feed 46 may allow for lower temperatures of the cooling stream 48, and therefore, more cooling for the turbine components. A front dividing seal 58 may control the amount of the CCA feed 46 that bypasses the pre-swirl nozzle 50 into a front chamber 60, as indicated by the arrow 62.

The cooling stream 48 may exit the pre-swirl nozzle 50 into a pre-swirl chamber 64, which may be defined by the pre-swirl nozzle 50 and the full face cover plate (or mini disk) 82. From the pre-swirl chamber 64, at least a portion of the cooling stream 48 may pass into a cooling chamber 66 where the cooling stream 48 may contact the full face cover plate 82 and the turbine disc 80, and continue to flow to the rotor blades 78. The full face cover plate 82 may serve to pressurize a portion of the cooling stream 48 before it enters the rotor blades 78. Furthermore, the full face cover plate 82 removes seals from the turbine disk 80, which may improves the life of the turbine disk 80.

The gas turbine engine 10 may include an inboard nozzle seal 68 and an outboard nozzle seal 70 upstream and downstream, respectively, of the discharge of the pre-swirl nozzle 50, that control leakage of the cooling stream 48 in the respective directions indicated by arrows 74 and 76, respectively. For example, the inboard nozzle seal 56 controls the leakage in a reverse direction 74 toward the front chamber 60. To enable the reverse flow from the pre-swirl chamber 64 to the front chamber 60, there may be a bypass channel 76 from the front chamber 60 to a bypass chamber 84. This may serve to lower the pressure in the front chamber 60 sufficiently to enable the reverse flow 72. This, together with the full face cover plate 82, may reduce potential polluting, or increase in temperature, of the flow at the inboard nozzle seal 68. The bypass channel 76 may be, but is not limited to, one or more pipes and/or tubes.

The front dividing seal 58, the inboard nozzle seal 68, and the outboard nozzle seal 70 generally may minimize fluid leakage between areas within the gas turbine engine 10, which may be important for engine performance. The seals 58, 68, and/or 70 may be a low-diameter seal, i.e., closer to the center line axis 28 of the gas turbine engine 10, to contribute to tighter seal clearances. While the seals 58, 68, and 70 are shown as labyrinth type seals, it should be appreciated that each may be any type of seal, including, but not limited to, a brush or a finger type seal.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine comprising:
   a compressor;
   a turbine;
   a combustor disposed between the compressor and the turbine, the combustor having an inner casing, the combustor defining a front chamber, the combustor further defining a bypass chamber in contact with the inner casing; and
   a pre-swirl nozzle configured to receive a cooling stream from the compressor, and to direct at least a portion of the cooling stream to the turbine, wherein the cooling stream exits the pre-swirl nozzle into a pre-swirl chamber, and a bypass channel extends through the pre-swirl nozzle from the front chamber to the bypass chamber to enable reverse flow from the pre-swirl chamber to the front chamber;
   wherein the pre-swirl nozzle is flexibly mounted to the combustor inner casing.

2. The gas turbine engine of claim 1 further comprising a mounting component attached to the combustor inner casing and to the pre-swirl nozzle such that the pre-swirl nozzle is flexibly mounted to the combustor inner casing.

3. The gas turbine engine of claim 2 wherein the mounting component is substantially conically shaped with a base at which location the mounting component is attached to the combustor inner casing.

4. The gas turbine engine of claim 2 wherein the mounting component is attached to the combustor inner casing by a retaining ring configured to create an interference fit between the mounting component and the combustor inner casing.

5. The gas turbine engine of claim 1 wherein the pre-swirl nozzle is made of a titanium alloy.

6. The gas turbine engine of claim 1 further comprising an inboard nozzle seal and an outboard nozzle seal, the outboard nozzle seal being configured to control a first portion of the cooling stream in a first direction, and the inboard nozzle seal being configured to control a second portion of the cooling stream in a reverse direction.

7. The gas turbine engine of claim 6 wherein at least one of the inboard nozzle seal and the outboard nozzle seal is a low-diameter seal.

8. The gas turbine engine of claim 6 further comprising a bypass channel that enables the reverse flow direction of the second portion of the cooling stream by reducing the pressure upstream of the inboard nozzle seal.

9. The gas turbine engine of claim 1 wherein the cooling stream is supplied by a cooled cooling air stream.

10. A pre-swirl nozzle assembly for a gas turbine engine, the gas turbine engine having a compressor, a combustor, and a turbine, the combustor being disposed between the compressor and the turbine, the combustor having an inner casing, the combustor defining a front chamber, the combustor further defining a bypass chamber in contact with the inner casing, the pre-swirl nozzle assembly comprising:

a pre-swirl nozzle configured to receive a cooling stream, and to direct at least a portion of the cooling stream to the turbine, the pre-swirl nozzle being flexibly mountable to an inner casing of the combustor, wherein the cooling stream exits the pre-swirl nozzle into a pre-swirl chamber; and a bypass channel extends through the pre-swirl nozzle from the front chamber to the bypass chamber to enable reverse flow from the pre-swirl chamber to the front chamber.

11. The pre-swirl nozzle assembly of claim 10 further comprising a mounting component attachable to the combustor inner casing such that the pre-swirl nozzle is flexibly mounted to the combustor inner casing.

12. The pre-swirl nozzle assembly of claim 11 wherein the mounting component is substantially conically shaped with a base at which location the mounting component is attachable to the combustor inner casing.

13. The pre-swirl nozzle assembly of claim 11 wherein the mounting component is attachable to the combustor inner casing by a retaining ring configured to create an interference fit between the mounting component and the combustor inner casing.

14. The pre-swirl nozzle assembly of claim 10 wherein the pre-swirl nozzle is made of a titanium alloy.

15. The pre-swirl nozzle assembly of claim 10 further comprising an inboard nozzle seal and an outboard nozzle seal, the outboard nozzle seal being configured to control a first portion of the cooling stream in a first direction, and the inboard nozzle seal being configured to control a second portion of the cooling stream in a reverse direction.

16. The pre-swirl nozzle assembly of claim 15 wherein at least one of the inboard nozzle seal and the outboard nozzle seal is a low-diameter seal.

17. The pre-swirl nozzle assembly of claim 15 further comprising a bypass channel that enables the reverse flow direction of the second portion of the cooling stream by reducing the pressure upstream of the inboard nozzle seal.

18. A gas turbine engine comprising:

a compressor configured to compress ambient air into a primary gas stream, a portion of which is cooled to form a cooled cooling air stream;

a combustor having an inner casing, the combustor defining a front chamber, the combustor further defining a bypass chamber in contact with the inner casing;

a turbine having a rotor with a plurality of blades; and a pre-swirl nozzle assembly having:

a pre-swirl nozzle configured to receive a portion of the cooled cooling air stream from the compressor to be utilized as a cooling stream to provide cooling to at least the plurality of blades, wherein the cooling stream exits the pre-swirl nozzle into a pre-swirl chamber;

a mounting component configured to flexibly attach the pre-swirl nozzle to the combustor inner casing; and a bypass channel extends through the pre-swirl nozzle from the front chamber to the bypass chamber to enable reverse flow from the pre-swirl chamber to the front chamber.

* * * * *